(12) United States Patent
Etherton et al.

(10) Patent No.: US 7,816,478 B2
(45) Date of Patent: Oct. 19, 2010

(54) POLYETHYLENE THICK FILM AND PROCESS FOR PREPARING POLYETHYLENE

(75) Inventors: Bradley P. Etherton, Cincinnati, OH (US); Stephen M. Imfeld, Mason, OH (US); Mohan Sasthav, Hamilton, OH (US)

(73) Assignee: Equistar Chemicals, LP, Houston, TX (US)

( * ) Notice: Subject to any disclaimer, the term of this patent is extended or adjusted under 35 U.S.C. 154(b) by 153 days.

(21) Appl. No.: 12/231,458

(22) Filed: Sep. 3, 2008

(65) Prior Publication Data

US 2010/0055432 A1    Mar. 4, 2010

(51) Int. Cl.
*C08F 210/14* (2006.01)
*C08F 10/14* (2006.01)
*C08F 4/64* (2006.01)
*C08F 4/76* (2006.01)

(52) U.S. Cl. .................... 526/348.2; 526/348; 526/113; 526/114; 526/116; 526/118; 526/119; 526/172; 526/161; 526/65

(58) Field of Classification Search .................. 526/348, 526/348.5, 348.2, 352.2, 116, 119, 172
See application file for complete search history.

(56) References Cited

U.S. PATENT DOCUMENTS

| 4,346,834 | A | 8/1982 | Mazumdar |
|---|---|---|---|
| 4,357,448 | A | 11/1982 | Tsubaki et al. |
| 6,211,311 | B1 | 4/2001 | Wang et al. |
| 6,232,260 | B1 | 5/2001 | Nagy et al. |
| 6,355,733 | B1 * | 3/2002 | Williams et al. ............ 525/191 |
| 6,451,724 | B1 | 9/2002 | Nifant'ev et al. |
| 6,486,270 | B1 | 11/2002 | Garrison et al. |
| 6,552,150 | B1 | 4/2003 | Nummila-Pakarinen et al. |
| 6,559,251 | B1 | 5/2003 | Wang et al. |
| 6,566,450 | B2 | 5/2003 | Debras et al. |
| 6,613,841 | B2 * | 9/2003 | Williams .................... 525/191 |
| 6,649,698 | B1 | 11/2003 | Mehta |
| 6,759,361 | B2 | 7/2004 | Lynch et al. |
| 6,794,468 | B1 | 9/2004 | Wang |
| 6,838,410 | B2 | 1/2005 | Wang et al. |
| 6,908,972 | B2 | 6/2005 | Tsuie et al. |
| 2004/0259722 | A1 | 12/2004 | Wang |
| 2005/0159300 | A1 | 7/2005 | Jensen et al. |
| 2007/0055021 | A1 | 3/2007 | Chandrashekar et al. |
| 2007/0142558 | A1 | 6/2007 | Mavridis |
| 2007/0167585 | A1 * | 7/2007 | Garrison et al. ............... 526/65 |

FOREIGN PATENT DOCUMENTS

| EP | 2058337 | | 5/2009 |
|---|---|---|---|
| JP | 54-78743 A | * | 6/1979 |
| WO | WO 99/24446 | | 5/1999 |
| WO | WO 01/53360 | | 7/2001 |
| WO | WO 03/020821 A1 | * | 3/2003 |

OTHER PUBLICATIONS

Stadler, et al., "Influence of Type and Content of Various Comonomers On Long-Chain Branching of Ethene/α-Olefin Copoymers", *Macromolecules* 2006, 39, 1474-1482.

* cited by examiner

*Primary Examiner*—Rip A. Lee
(74) *Attorney, Agent, or Firm*—John Tyrell; Jonathan L. Schuchardt

(57) ABSTRACT

A thick film and process to prepare polyethylene useful for the film are disclosed. Ethylene is polymerized in two reaction zones with a $C_6$-$C_{10}$ α-olefin in the presence of a catalyst system comprising an activator, a supported bridged zirconium complex, and a supported non-bridged zirconium complex. The process yields medium density to linear low density polyethylene having a melt index from 0.20 to 1.0 dg/min. Thick films from the polyethylene have a superior combination of high impact strength and high modulus.

5 Claims, No Drawings

POLYETHYLENE THICK FILM AND PROCESS FOR PREPARING POLYETHYLENE

FIELD OF THE INVENTION

The invention relates to a thick film with a good balance of processability and physical properties and to a multizone process for preparing polyethylene useful for the films.

BACKGROUND OF THE INVENTION

While Ziegler-Natta catalysts are a mainstay for polyolefin manufacture, single-site catalysts represent the industry's future. These catalysts are often more active than Ziegler-Natta catalysts, and they often produce polymers with improved physical properties. However, in the production of linear low density polyethylene for film applications, Ziegler-Natta catalysts still predominate. One reason is that it has been difficult to process resins from single-site catalysts to produce polyethylene films with good properties, especially for thick films. Single-site polyethylene often processes poorly because of its narrow molecular weight distribution.

U.S. Pat. Nos. 6,232,260, 6,451,724, 6,559,251 and PCT Int. Appl. WO 01/53360 disclose the use of transition metal catalysts based upon indenoindolyl ligands. Indenoindolyl catalysts are remarkably versatile because substituent effects and bridging changes can often be exploited to provide polymers with tailored physical or mechanical properties. Non-bridged indenoindolyl complexes (as exemplified in the '260 patent) usually provide favorable activity although they sometimes fail to provide polymers having high enough molecular weights. Bridged indenoindolyl complexes (as taught, e.g., in U.S. Pat. No. 6,908,972) readily copolymerize α-olefins and provide polymers with varying levels of long-chain branching. Some of the examples of the '972 patent provide polymers with very low long-chain branching (see, e.g., Example 15, which reports no long-chain branching and $M_w$=90,700). For a discussion of long-chain branching in polyethylene, see *Macromolecules* 39 (2006) 1474 and references cited therein. Pending application Ser. No. 11/899,090, filed Sep. 4, 2007, and U.S. Pat. Nos. 7,655,740, 7,666,961, and 7,723,451 relate to slurry processes that provide polyethylene with varying levels of long-chain branching.

To produce medium or low density polyethylene, a catalyst system must have the ability to incorporate α-olefins. Some catalysts that incorporate α-olefins well also produce polyethylene with high levels of long-chain branching. Other catalysts can produce polyethylene with little or no long-chain branching. Long-chain branching has a pronounced effect on rheology. For some applications, it is desirable to have a moderate amount of long-chain branching. A desirable process would easily incorporate α-olefins in order to control density and other properties. Also important is the ability to produce polyethylene with high molecular weight.

U.S. Pat. No. 7,423,098 describes a bridged indenoindolyl complex for the slurry polymerization of ethylene in two reactor zones to produce polyethylene with a bimodal molecular weight distribution, a density of from 0.91 to 0.94 g/cm³, and a melt index of from 0.10 to 0.80 dg/min with good film properties. However, there is still a tradeoff between processability and film properties. Not disclosed is the use of a combination of a supported bridged zirconium complex and a supported non-bridged zirconium complex.

Multizone slurry polymerizations of ethylene with Ziegler-Natta catalysts are known. For example, U.S. Pat. No. 4,357,448 discloses a two-step process for polymerizing ethylene in the presence of a Ziegler-Natta catalyst in combination with a reaction product of a titanium or vanadium halogen-containing compound with a first reaction product of a Grignard reagent with a hydropolysiloxane. A small amount of a second α-olefin is optionally used and the lowest reported density is 0.9515 g/cm³. The reference does not teach how to make medium density or linear low density polyethylenes with good film properties.

U.S. Pat. No. 6,486,270 discloses a process to polymerize ethylene with a $C_3$-$C_{10}$ α-olefin in the presence of high levels of hydrogen to make polyethylene with a density of from 0.92 to 0.94 g/cm³ with multiple reaction zones using a Ziegler-Natta catalyst. The polyethylene has improved film properties versus high-density polyethylene, but the film properties are insufficient for many applications. For example, when the polyethylene is blown with a low stalk into a film having a thickness of 13 microns, the dart drop impact strength is less than about 100 grams per mil.

There has been some use of single-site catalysts in two reaction zones. U.S. Pat. No. 6,566,450 discloses a process using bis-indenyl single-site catalysts to produce polyethylene with a bimodal molecular weight distribution having a density of from 0.95 to 0.96 g/cm³ useful as pipe resin. Not taught is how to make medium density or linear low density polyethylene with good film properties.

U.S. Pat. No. 6,552,150 discloses a process which polymerizes ethylene in two reaction zones to give bimodal polyethylene with a density of 0.929 to 0.934 g/cm³ and good film properties. The low molecular weight portion has an $MI_2$ greater than 100, which can cause problems with film homogeneity. Thick films are not prepared. The exemplified melt indices and blow-molding process conditions are not suitable for thick films. A Ziegler-Natta catalyst is preferred. The preferred process is a slurry loop reactor followed by a gas-phase reactor. While this process gives polyethylene with good properties, it would be desirable to produce polyethylene in an all-slurry or all-gas-phase process. A combination slurry and gas-phase process adds complexity and cost. The reference teaches that "while it may be possible to use a process comprising cascaded slurry reactors only, such a process is not recommended, due to problems which may occur when a component having a low density is dissolved in the reaction diluent."

Heretofore, it has been difficult to achieve low densities with Ziegler-Natta catalysts in two reaction zones in a slurry process. Because of poor comonomer incorporation, waxes build up and can foul the reactor. Single-site catalysts are known to give improved comonomer incorporation, but they often cannot achieve the required molecular weight due to competing chain termination reactions and decompositions which produce hydrogen. The resultant polyethylene has inferior film properties. Often single-site catalysts that achieve the required high molecular weight also give high levels of long-chain branching. This can help processability by imparting good bubble stability in the film blowing process, but can have a deleterious effect on the impact strength. Another common tradeoff is between modulus and impact strength. Often, in order to obtain sufficient impact strength, the modulus must be low.

Films from polyolefin blends are known, but because property requirements vary with different applications and because film properties such as impact strength are based upon tradeoffs between processing, thickness, and modulus, further improvements are needed. U.S. Pat. No. 6,649,698 discloses blends of high molecular weight HDPE with LLDPE and their improved environmental stress crack resistance. The blends are used as geomembranes (polymer sheets used as environmental barriers) and pipes. Environmental stress crack data is given, but there are no other reported properties of the blends. Thick films are not disclosed.

Thin films have been studied for applications such as grocery sacks. U.S. Pat. No. 4,346,834 improves the thin film (preferably between 20 and 40 microns) properties of low density polyethylene (LDPE) by blending 5-20% by weight HDPE and LLDPE with the LDPE to provide a ternary blend. All of the blends contain LDPE and there is nothing disclosed about thick films.

U.S. Pat. No. 6,355,733 discloses a blend of LLDPE with medium density polyethylene having multimodal molecular weight distribution. The reported blends have a low modulus (examples range from 52,000 to 62,000 psi) and a low density (examples range from 0.927 to 0.931 g/cm$^3$). The disclosure states that HDPE blends with LLDPE do not usually perform synergistically and solves this problem by using MDPE with multimodal molecular weight distribution.

Post reactor blending of polyethylene with LDPE improves melt strength and enables formation of thick films. Improved melt strength imparted by LDPE is not always necessary for thin films but is needed to blow thick films. Commercial thick films often contain 5-25% by weight LDPE. However, the LDPE is detrimental to modulus and impact strength. While HDPE can be added to increase the modulus, HDPE is also detrimental to impact strength.

In sum, there is a continuing need for a thick film that can be made without LDPE. There is a need for an all-slurry or all-gas-phase process that can provide medium or linear low density polyethylene that has the right balance of properties, i.e., the right amount of long-chain branching to enable good processability while making thick films with high modulus and good impact strength.

SUMMARY OF THE INVENTION

In one aspect, the invention is a thick film having a good balance of processability and physical properties. The film comprises polyethylene and less than 3 wt. % of low density polyethylene (LDPE). The polyethylene comprises recurring units of ethylene and a $C_6$-$C_{10}$ α-olefin and has a bimodal molecular weight distribution. The polyethylene also has a melt index from 0.20 to 1.0 dg/min., a density within the range of 0.92 to 0.94 g/cm$^3$, and sufficient long-chain branching to impart good processability as indicated by a viscosity enhancement factor (VEF) of 2 to 7. The film, which has a thickness from 50 to 250 microns, has excellent impact strength. In particular, a 2-mil film blown from the polyethylene has a machine-direction modulus greater than 35,000 psi and a dart drop impact strength of greater than 125 g/mil.

In another aspect, the invention is a process for preparing polyethylene having sufficient long-chain branching to impart good processability during film manufacture. Ethylene and a $C_6$-$C_{10}$ α-olefin are copolymerized in two reaction zones in the presence of a catalyst system comprising an activator, a supported dialkylsilylene-bridged cyclopentadienyl indeno[2,1-b]indolyl zirconium complex, and a supported non-bridged cyclopentadienyl indeno[1,2-b]indolyl zirconium complex. The molar ratio of bridged to non-bridged complexes is from 0.7:1 to 5:1. The polyethylene is valuable for making thick films.

DETAILED DESCRIPTION OF THE INVENTION

Thick films of the invention have a good balance of processability and physical properties. By "thick film," we mean the film has a thickness from 50 to 250 microns. Thin films generally have a thickness less than about 25 microns. When thickness exceeds 300 microns, the article is generally considered to be a sheet rather than a film. Preferably, films of the invention have a thickness from 50 to 200 microns.

The films comprise less than 3% by weight LDPE, which can be included as a blend. Preferably, LDPE is not blended with the polyethylene. LDPE is typically made with a high-temperature, high-pressure radical process. While LDPE can be used to improve melt strength, it sometimes has a detrimental effect on impact strength and modulus. Polyethylene made by the process of the invention has sufficient melt strength such that LDPE is not needed.

Optionally, the films include from 1 to 40 wt. % preferably from 5 to 15 wt. %, of LLDPE. Addition of LLDPE improves tear strength and impact strength, but typically is detrimental to modulus. LLDPE prepared using metallocene catalysts is preferred.

Polyethylene useful for the thick films comprises recurring units of ethylene and a $C_6$-$C_{10}$ α-olefin. It has a bimodal molecular weight distribution, which is apparent from inspection of a gel permeation chromatograph. The polyethylene has a density within the range of 0.92 to 0.94 g/cm$^3$, preferably from 0.925 to 0.935 g/cm$^3$, as measured by ASTM D1505-96. The polyethylene has a melt index ($MI_2$, as measured by ASTM D1238, Condition 190/2.16) within the range of 0.20 to 1.0 dg/min.

The films are made from polyethylene having significant long-chain branching, as evident from a viscosity enhancement factor (VEF) within the range of 2 to 7. The description of VEF and how to determine it are discussed in more detail further below.

In another aspect, the invention is a process for preparing polyethylene useful for thick films. The polyethylene has sufficient long-chain branching to impart good processability during film manufacture. In the process, ethylene and a $C_6$-$C_{10}$ α-olefin are polymerized in at least two slurry reaction zones or at least two gas-phase reaction zones in the presence of a catalyst system comprising an activator, a supported dialkylsilylene-bridged cyclopentadienyl indeno[2,1-b]indolyl zirconium complex, and a supported non-bridged cyclopentadienyl, indeno[1,2-b]indolyl zirconium complex. Suitable $C_6$-$C_{10}$ α-olefins include 1-hexene, 1-octene, and mixtures thereof. Preferably, the α-olefin is 1-octene. Surprisingly, we found that lower α-olefins such as 1-butene give inferior film properties.

Preferably, the polymerization is an all-slurry process and is conducted in at least two reaction zones. Preferably, greater than 50% by weight of the total $C_6$-$C_{10}$ α-olefin is added to the second reaction zone; more preferably, greater than 70% by weight is added.

Preferably, from 35 to 75% by weight of the polymer is produced in a first reaction zone. Hydrogen is advantageously used to control the molecular weight in both reaction zones. The amount of hydrogen used depends upon the desired polyolefin molecular weight and melt flow properties. Generally, as the amount of hydrogen is increased, the polyolefin molecular weight decreases and the melt flow rate increases. Preferably, the first reaction zone has a hydrogen to ethylene mole ratio in the vapor phase of from 0.00005:1 to 0.01:1 to produce a first-zone material having a melt index ($MI_2$) of from 0.5 to 30 dg/min. This material is transferred to a second reaction zone. Preferably, the second-zone hydrogen to ethylene mole ratio in the vapor phase is from 0.000001:1 to 0.003:1.

Preferably, a higher concentration of hydrogen is used in the first reaction zone to give a first-zone material with a lower molecular weight or higher melt index than the second-zone material. Preferably, the first-zone material has a melt index ($MI_2$) of from 0.2 to 30 dg/min, more preferably from 0.5 to 15 dg/min, and the final polyethylene produced has a melt index of from 0.20 to 1.0 dg/min.

The product is polyethylene with a bimodal molecular weight distribution, a density of from 0.92 to 0.94 g/cm$^3$, and a melt index (MI$_2$) of from 0.20 to 1.0 dg/min. Preferably, the polyethylene has a density of from 0.925 to 0.935 g/cm$^3$. Preferably, each reaction zone is operated at a temperature from 60° C. to 100° C.

Preferably, the process is an all-slurry process. The slurry reaction zones preferably include an inert solvent. Useful solvents include saturated aliphatic and aromatic hydrocarbons. Saturated aliphatic hydrocarbons are preferred. Preferably, the solvent has a boiling point at atmospheric pressure in the range of 30° C. to 150° C. Solvents of lower boiling points are difficult to handle and can create high pressure in the reaction zone. Higher-boiling solvents can be difficult to remove at the end of the process. Suitable solvents include pentane, hexane, heptane, octane, toluene, xylene, and cyclohexane and mixtures of solvents such as Isopar®G solvent (product of ExxonMobil Corporation).

The catalyst system comprises two single-site catalysts and an activator. Suitable activators include alumoxanes, alkyl aluminum compounds, organoboranes, ionic borates, ionic aluminates, aluminoboronates and mixtures thereof. Examples include methylalumoxane (MAO), polymeric MAO (PMAO), ethylalumoxane, diisobutylalumoxane, lithium tetrakis(pentafluorophenyl) borate, dimethylanilinium tetrakis(pentafluorophenyl)borate, trityl tetrakis(pentafluorophenyl)-borate, tris(pentafluorophenyl)borane, triphenylborane, tri-n-octylborane, and the like, and mixtures thereof. Aluminoboronates can also be used (see U.S. Pat. No. 6,759,361, the teachings of which are incorporated herein by reference). Preferably, the activator is methylalumoxane. Selection of activator depends on many factors including the organometallic complex used and the desired polymer properties.

The optimum amount of activator needed relative to the amount of complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of 0.01 to 5000 moles, preferably from 10 to 500 moles, and more preferably from 10 to 200 moles, of aluminum per mole of zirconium. When the activator is an organoborane or an ionic borate or aluminate, the amount used will be within the range of 0.01 to 5000 moles, preferably from 0.1 to 500 moles, of activator per mole of zirconium. The activator can be combined with the complex and added to the reactor as a mixture, or the components can be added to the reactor separately.

There are many suitable ways to introduce the activator. For example, the activator can be added directly to the polymerization reactor. In one preferred embodiment, a solution of the activator is added to a support material prior to the addition of the organometallic complex. More preferably, the organometallic complex is premixed with a solution of the activator prior to addition to the support material. Preferably, the organometallic complex and activator solution are premixed for a period of time between 1 minute and two hours. When the organometallic complex is premixed with a solution of the activator, optionally a portion of the activator can be premixed and the remainder of the activator added to the reactor.

Preferably, a scavenging amount of an alkylaluminum compound such as triethylaluminum or triisobutylaluminum is also added to at least one of the polymerization reactors. More preferably, the alkylaluminum compound is added to each of the polymerization reactors. Typically, some alkylaluminum compound is added to the reactor prior to the addition of the supported complex, and once the reaction is underway, additional alkylaluminum compound is added to the reactor concurrently with additional supported complex.

Preferably, the catalyst system is fed to the first zone and, after transfer of the slurry to the second zone, residual catalyst is suitable to continue the polymerization. Optionally, the catalyst system may be added to each of the reaction zones.

In addition to the activator, the catalyst system comprises two single-site complexes: a supported bridged zirconium complex and a supported non-bridged zirconium complex. The bridged complex is a dialkylsilylene-bridged cyclopentadienyl indeno[2,1-b]indolyl zirconium complex. The non-bridged complex is a cyclopentadienyl indeno[1,2-b]indolyl zirconium complex.

Indenoindolyl ligands and ways to name, synthesize, and incorporate them into transition metal complexes have been described in considerable detail elsewhere; see, for example U.S. Pat. Nos. 6,838,410, 6,794,468, 6,232,260, and 6,559,251, the teachings of which are incorporated herein by reference. Suitable procedures for making the ligands and complexes also appear in PCT Int. Appls. WO 99/24446 and WO 01/53360.

Additionally, the complexes usually include ancillary ligands that are bonded to the metal and satisfy the valence of the metal. The ancillary ligands can be labile or polymerization-stable, but usually at least one labile ligand (such as halides, alkoxys, aryloxys, alkyls, alkaryls, aryls, dialkylaminos, or the like) is present. Particularly preferred labile ligands are halides, alkyls, and alkaryls (e.g., chloride, methyl, and benzyl).

Indenoindolyl complexes can be made by any suitable method; those skilled in the art will recognize a variety of acceptable synthetic strategies. Often, the synthesis begins with preparation of the desired indenoindole compound from particular indanone and arylhydrazine precursors. Treatment with base gives a ligand precursor. The indenoindole is linked to a cyclopentadienyl group to give a linked ligand precursor. The final step normally involves reaction of the ligand precursor with a zirconium source to give the complex. Any convenient source of zirconium can be used to make the complex. The zirconium source conveniently has labile ligands such as halide or dialkylamino groups that are easily displaced by indenoindolyl anions. Examples are halides (e.g., ZrCl$_4$), alkoxides, amides, and the like.

The bridged complex is a dialkylsilylene-bridged cyclopentadienyl, indeno[2,1-b]indolyl zirconium complex. Preferred bridged complexes have the structure:

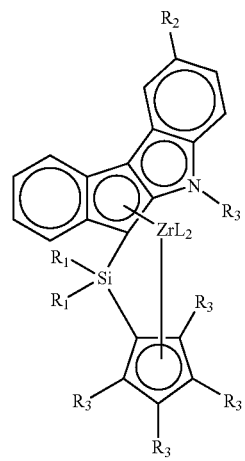

wherein each R$_1$ is independently selected from the group consisting of C$_1$-C$_6$ alkyl; R$_2$ is selected from the group consisting of H and $C_1$-$C_{10}$ hydrocarbyl; each $R_3$ is independently selected from the group consisting of H and $C_1$-$C_{10}$ hydrocarbyl; and each L is independently selected from the group consisting of halide, alkoxy, aryloxy, siloxy, alkylamino, and $C_1$-$C_{30}$ hydrocarbyl.

The non-bridged complex is a cyclopentadienyl indeno[1,2-b]indolyl zirconium complex. Preferred non-bridged complexes have the structure:

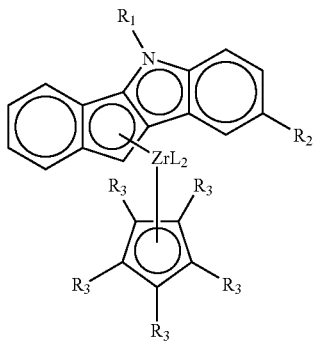

wherein $R_1$ is $C_1$-$C_6$ alkyl; $R_2$ is selected from the group consisting of H and $C_1$-$C_{10}$ hydrocarbyl; each $R_3$ is independently selected from the group consisting of H and $C_1$-$C_{10}$ hydrocarbyl; and each L is independently selected from the group consisting of halide, alkoxy, aryloxy, siloxy, alkylamino, and $C_1$-$C_{30}$ hydrocarbyl.

The molar ratio of the bridged to non-bridged complex is from 0.7:1 to 5:1, preferably from 2:1 to 4:1.

The zirconium complexes are supported, either separately or on a single support. The support can be any inert material such as polyethylene, magnesium chloride, silica, alumina, titania, or the like. Silica is preferred. The support is preferably treated thermally, chemically, or both prior to use to reduce the concentration of surface hydroxyl groups. Thermal treatment consists of heating (or "calcining") the support in a dry atmosphere at elevated temperature, preferably greater than 100° C., and more preferably from 150 to 600° C., prior to use. A variety of different chemical treatments can be used, including reaction with organoaluminum, -magnesium, -silicon, or -boron compounds. See, for example, the techniques described in U.S. Pat. No. 6,211,311, the teachings of which are incorporated herein by reference.

Catalyst concentrations used for the olefin polymerization depend on many factors. Preferably, however, the concentration ranges from 0.01 micromoles zirconium metal per liter to 100 micromoles per liter. Polymerization times depend on the type of process, the catalyst concentration, and other factors. Generally, polymerizations are complete within several seconds to several hours.

The process provides polyethylene with sufficient long-chain branching to impart good processability during film manufacture. Typically, the polyethylene will have a measured viscosity enhancement factor between 2 and 7. As described in *Macromolecules* 39 (2006) 1474, rheological measurements can be used to estimate the amount of long-chain branching. At low shear rates, the melt viscosity of polyethylene with long-chain branching is higher than the melt viscosity of linear polyethylene of equivalent molecular weight. We can use a viscosity enhancement factor (VEF) as an indication of long-chain branching. The viscosity is measured by dynamic oscillatory shear of a sample between parallel plates. The viscosity enhancement factor can be determined from the ratio of the measured viscosity of molten polyethylene at a fixed temperature and frequency to the melt viscosity predicted for a linear polyethylene of equivalent molecular weight. Preferably, the temperature used is 190° C. and the frequency is 0.025 rad/s.

By "viscosity enhancement factor," we mean the ratio of the measured viscosity at 190° C. and a frequency of 0.025 rad/s to the viscosity predicted for linear polyethylene of equivalent molecular weight. The viscosities of more than forty linear polyethylene samples of varying weight-average molecular weight were measured to develop the relationship between $M_w$ and viscosity at 0.025 rad/s. The viscosity prediction for linear polyethylene=$(2.1 \times 10^{-14})(M_w^{3.66})$. A linear polyethylene will have a viscosity enhancement factor of about 1, while a sample of polyethylene known to have substantial long-chain branching had a viscosity enhancement factor of 15. For more details about how to measure and compute VEF, see pending application Ser. No. 11/897,438, filed Aug. 29, 2007, the teachings of which are incorporated herein by reference.

High long-chain branching provides good bubble stability, a property that is critical for blown film formation. However, if the long-chain branching is too high, there is a detrimental effect on the impact strength of the film. The process of the invention provides polyethylene with sufficient long-chain branching to enable good bubble stability while maintaining good impact strength in the blown film.

Typically, linear low density polyethylene is blown into films in machines operating such that the bubble is blown with a low stalk. This bubble configuration is known as in-the-pocket. By "in-the-pocket," we mean that the polymer exits the die and is held parallel to the air ring cone by venturi forces due to the rapidly moving cooling air in a way such that the bubble shape is formed shortly after it exits the die. This typically results in a bubble with a lower frost-line and typically a lower blow-up ratio than observed with the high-stalk process. The "blow-up ratio" is the ratio of the diameter of the bubble to the diameter of the die. Preferably, when the polyethylene is blown in-the-pocket, a blow-up ratio of less than 3:1 is used. In a high-stalk process, the polymer exits the die with an original diameter comparable to that of the die. At a point above the die, the polymer relaxes and the bubble expands to a larger diameter. Although less preferred, a high-stalk process can also be used to blow the film. "High stalk" generally means that a relatively high blow-up ratio, usually greater than 3:1, and a relatively high frost-line height have been employed. High-stalk conditions allow less machine-direction orientation of the polymer. This increases the mechanical strength of the film. Greater dart drop impact strength is obtained when high-stalk conditions are used. When comparing film properties, it is important to compare films processed under similar conditions.

By "dart drop impact strength," we mean the impact resistance of plastic film as measured by ASTM D1709, Method A. A dart is dropped from a height of 66 cm and the impact resistance is derived from the mass of the dart required to break 50% of a large number of specimens. By "modulus" we mean the 1% secant tensile modulus of plastic film measured by ASTM D882-02. By "tear strength" we mean the propagation tear resistance of plastic films measured by ASTM D1922-03a. This test is sometimes called the Elmendorf tear test. The tear strength measured along the machine direction of the film is the MD tear strength. Likewise, the tear strength measured perpendicular to the machine direction is the TD tear strength. A thick film of the invention has a machine-direction modulus greater than 35,000 psi and a dart drop impact strength of greater than 125 g/mil.

The following examples merely illustrate the invention. Those skilled in the art will recognize many variations that are within the spirit of the invention and scope of the claims.

Example 1

Ethylene-Octene Copolymer

Polyethylene is made in a reactor consisting of two reaction zones operating in series. Each reactor is a 100-gallon continuous stirred tank reactor which contains 80 gallons of reaction mixture. The temperature of the first reaction zone ("A" reactor) is 71° C. and that of the second reaction zone ("B" reactor) is 77° C.

Methylalumoxane (4.21 M solution in toluene, product of Albemarle) is added at room temperature to a slurry of silica (G3, available from Fuji Silysia Chemical Ltd., calcined at 250° C. for 12 hours) in anhydrous toluene. The resulting stirred slurry is heated at 80° C. for two hours and cooled to ambient temperature. A mixture of two complexes, (5,6-dihydro-2,5-dimethyl-6-(cyclopentadienyldimethylsilylene) indeno[2,1-b]indole-6-yl)-zirconium dichloride and (5,10-dihydro-5,8-dimethylindeno[1,2-b]indole-10-yl) (cyclopentadienyl)zirconium dichloride in a 3:1 molar ratio is added to the slurry and stirred for 2 hours at ambient temperature. The toluene slurry is filtered. Hexane is added to the filtered solids and they are resuspended in the hexane. The slurry is filtered in order to wash the solids. The solids are resuspended in hexane again and used as the slurry. The solid catalyst contains 0.61% by weight zirconium and 19.8% by weight aluminum.

The catalyst slurry is fed to reactor A at a rate of 4.4 g of solid catalyst per hour. Triisobutylaluminum (5.0 g per hour), an antistatic agent, oleyl bis-(2-hydroxyethyl)amine (available from Akzo Nobel as Armostat® A710) (2.1 g per hour), hexane (88 kg per hour), ethylene (12 kg per hour), and 1-octene (1.5 kg per hour) are continuously fed to the A reactor. The hydrogen to ethylene mole ratio in the vapor phase is $1.49 \times 10^{-3}$. The A reactor pressure is 0.26 MPa. The slurry from the A reactor flows into a low pressure separator where ethylene and hydrogen are separated from the slurry which then flows into the B reactor.

No additional catalyst is added to the B reactor. Triisobutylaluminum (TIBAL) (1.6 g per hour), oleyl bis-(2-hydroxyethyl)amine (2.3 g per hour), hexane (23 kg per hour), ethylene (20 kg per hour), and 1-octene (9.1 kg per hour) are fed to the B reactor. The hydrogen to ethylene mole ratio in the vapor phase is $2.7 \times 10^{-4}$. The B reactor pressure is 0.69 MPa. The slurry from the B reactor flows into a low pressure separator where ethylene and hydrogen are separated from the hexane slurry.

The slurry is centrifuged to recover wet polymer powder. The powder is dried and is compounded with 1000 ppm calcium stearate, 1000 ppm tetrakis[methylene-3-(3,5-di-tert-butyl-4-hydroxypheny-propionate)]methane (available from Ciba Specialty Chemicals Company as Irganox® 1010), and 1500 ppm tris(2,4-di-tert-butylphenyl)phosphite (available from Ciba Specialty Chemicals as Irgafos® 168) in a Farrel continuous mixer and at a discharge temperature of about 220° C. The melt is pelletized in an extruder directly connected to the mixer.

The properties of the polymer made in the "A" reactor and the properties of the pelletized product are shown in Table 3. The fraction of product made in the A reaction zone is 43 weight percent. The polymer from the A reactor has a melt index ($MI_2$) of 1.1 dg/min. as measured according to ASTM D1238, Condition 190/2.16 and a density of 0.939 g/cm³ measured according to ASTM D-1505-96. The pelletized product has a bimodal molecular weight distribution, a melt index of 0.36 dg/min. and a density of 0.930 g/cm³.

The polyethylene is extruded on a 100-mm Davis-Standard blown film line equipped with a 64-mm diameter barrier screw with a Maddock mixing section. The extruder has four heating zones set at 193° C. for zone 1 and 199° C. for the remaining three zones. The screw speed is set at 41 RPM. Thick film (2 mil; 50 microns) is blown in-the-pocket using a blow-up ratio of 2.5 and a frost-line height of 25 cm. Dart drop impact resistance is measured according to ASTM Method D1709 to be 160 g/mil. The film modulus (1% secant modulus) is measured according to ASTM D882 to be 53,000 psi in the machine direction (MD) and 68,000 psi in the transverse direction (TD). The MD tear strength is measured according to ASTM D1922 to be 79 g/mil and the TD tear strength measured to be 400 g/mil.

Examples 2-4

Ethylene-Octene Copolymers

Polyethylenes are made in a reactor consisting of two reaction zones operating in series in similar fashion as in Example 1. The results are shown in Tables 1-4.

Each of the polyethylene films from Examples 1-4 exhibits high modulus in combination with good impact strength (dart drop greater than 125 g/mil) and good tear strength (greater than 70 g/mil in the machine direction and greater than 350 g/mil in the transverse direction).

Comparative Example 5

Ethylene-Butene Copolymer

Polyethylene is made in a reactor consisting of two reaction zones operating in parallel, but using 100% of the non-bridged complex, (5,10-dihydro-5,8-dimethylindeno[1,2-b]indole-10-yl)(cyclopentadienyl)zirconium dichloride, supported on silica and 1-butene as the comonomer. The solid catalyst contains 0.68% by weight zirconium and 20.3% by weight aluminum and is fed to reactor A at 1.7 g per hour and also to reactor B at 2.6 g per hour. The slurries from the two reactors are combined in the low pressure separator of the B reactor. The slurry is then centrifuged, dried, and compounded as described in Example 1. The results are shown in Tables 1-4.

Both the 1-mil and 3-mil thick films have inferior modulus, impact strength, and tear strength when compared with films made by the inventive process. This shows the importance of proper comonomer selection and that use of a non-bridged complex only is inferior to using a mixture of bridged and non-bridged complexes.

Comparative Example 6

Ethylene-Butene Copolymer

Polyethylene is made in a reactor consisting of two reaction zones operating in parallel in similar fashion as in Comparative Example 5, but using 100% of the bridged complex, (5,6-dihydro-2,5-dimethyl-6-(cyclopentadienyldimethylsilylene)indeno[2,1-b]indole-6-yl)zirconium dichloride, and 1-butene as the comonomer. The solid catalyst contains 0.59% by weight zirconium and 21.1% by weight aluminum and is fed to reactor A at 2.0 g per hour and also to reactor B at 2.0 g per hour. The results are shown in Tables 1-4.

Both the 1-mil and 3-mil thick films have inferior modulus, impact strength, and tear strength when compared with films made by the inventive process. This shows the importance of proper comonomer selection and that use of a bridged complex only is inferior to using a mixture of bridged and non-bridged complexes.

Comparative Example 7

Ethylene-Butene Copolymer

Polyethylene is made in a reactor consisting of two reaction zones operating in series in similar fashion as in Example 1 and using the same ratio of the same complexes, but using 1-butene as the comonomer. The results are shown in Tables 1-4.

The modulus is improved compared with Comparative Examples 5 and 6, but the impact strength and tear strength are inferior to films made by the inventive process. This shows that using a mixture of bridged and non-bridged complexes is not sufficient unless done in combination with the proper selection of comonomer.

Examples 8 and 9

Ethylene-Octene Copolymers

Polyethylenes are made in a reactor consisting of two reaction zones operating in series in similar fashion as in Example 1. The results are shown in Tables 1-4. A slightly higher amount of 1-octene is used in reactor A resulting in a slight decrease in modulus and density.

Each of the polyethylene films from Examples 8 and 9 exhibits good impact strength (dart drop greater than 125 g/mil).

TABLE 1

"A" Reactor Conditions

| Ex. | Bridged complex (mole %) | Non-bridged complex (mole %) | Pressure (mPa) | Ethylene (lb/h) | Comonomer (lb/h) | $H_2/C2$ (mole ratio) | Catalyst (g/h) | $R_3Al$ (g/h) |
|---|---|---|---|---|---|---|---|---|
| 1 | 75 | 25 | 0.26 | 27 | 3.2 (octene) | 0.0015 | 4.4 | 5.0 TIBAL |
| 2 | 75 | 25 | 0.26 | 27 | 4.0 (octene) | 0.0045 | 4.5 | 5.5 TIBAL |
| 3 | 75 | 25 | 0.25 | 27 | 4.4 (octene) | 0.0046 | 7.9 | 3.9 TIBAL |
| 4 | 75 | 25 | 0.22 | 27 | 4.3 (octene) | 0.0026 | 4.4 | 5.4 TIBAL |
| C5 | 0 | 100 | 0.57 | 30 | 5.0 (butene) | 0.00023 | 1.7 | 0.84 TIBAL |
| C6 | 100 | 0 | 0.79 | 35 | 4.5 (butene) | 0.0052 | 2.0 | 0.94 TIBAL |
| C7 | 75 | 25 | 0.23 | 27 | 2.0 (butene) | 0.0024 | 3.0 | 0.94 TIBAL |
| 8 | 75 | 25 | 0.26 | 27 | 5.0 (octene) | 0.0065 | 2.7 | 3.9 TIBAL |
| 9 | 75 | 25 | 0.37 | 27 | 5.5 (octene) | 0.0064 | 2.7 | 0.62 TEAL |

TABLE 2

"B" Reactor Conditions

| Ex. | Pressure (mPa) | Ethylene (lb/h) | Comonomer (lb/h) | $H_2/C2$ (mole ratio) | Catalyst (g/h) | $R_3Al$ (g/h) |
|---|---|---|---|---|---|---|
| 1 | 0.67 | 44 | 20 (octene) | 0.00027 | 0 | 1.6 TIBAL |
| 2 | 0.70 | 44 | 20 (octene) | 0.00032 | 0 | 1.6 TIBAL |
| 3 | 0.87 | 44 | 20 (octene) | 0.00028 | 0 | 1.6 TIBAL |
| 4 | 0.76 | 44 | 20 (octene) | 0.00020 | 0 | 1.0 TIBAL |
| C5 | 0.59 | 35 | 5.9 (butene) | 0.00024 | 2.6 | 1.0 TIBAL |
| C6 | 0.77 | 35 | 4.3 (butene) | 0.0051 | 2.0 | 0.94 TIBAL |
| C7 | 0.88 | 44 | 10 (butene) | 0.00025 | 0 | 0.94 TIBAL |
| 8 | 0.40 | 44 | 19 (octene) | 0.00090 | 0 | 7.5 TIBAL |
| 9 | 0.60 | 44 | 21 (octene) | 0.00049 | 0 | 0.62 TEAL |

TABLE 3

| | Polyethylene Properties | | | | | |
|---|---|---|---|---|---|---|
| Ex. | Wt. % made in Reactor A | $MI_2$ (dg/min) Reactor A Powder | Density, Reactor A Powder (g/cm$^3$) | Pellet $MI_2$ (dg/min) | Pellet density (g/cm$^3$) | Pellet VEF |
| 1 | 43 | 1.1 | 0.939 | 0.36 | 0.930 | 3.60 |
| 2 | 43 | 4.9 | 0.938 | 0.48 | 0.931 | 3.35 |
| 3 | 40 | 10 | 0.941 | 0.41 | 0.932 | 4.12 |
| 4 | 38 | 5.0 | 0.937 | 0.58 | 0.932 | 2.42 |
| C5 | 50 | 1.1 | 0.927 | 1.00 | 0.928 | — |
| C6 | 50 | 0.22 | 0.926 | 0.65 | 0.926 | 5.28 |
| C7 | 43 | 9.0 | 0.937 | 0.53 | 0.929 | 1.38 |
| 8 | 43 | 2.8 | 0.930 | 0.64 | 0.924 | 6.52 |
| 9 | 43 | 3.6 | 0.932 | 0.60 | 0.929 | 5.93 |

TABLE 4

| | Film Properties | | | | | |
|---|---|---|---|---|---|---|
| Polymer Ex. | Film Thickness (mil) | MD Modulus (psi) | TD Modulus (psi) | MD Tear (g/mil) | TD Tear (g/mil) | Dart Drop (g/mil) |
| 1 | 2.0 | 52,500 | 68,300 | 79 | 400 | 160 |
| 2 | 2.0 | 55,000 | 65,900 | 100 | 500 | 150 |
| 3 | 2.0 | 58,700 | 69,000 | 80 | 480 | 140 |
| 4 | 2.0 | 55,700 | 71,000 | 74 | 470 | 130 |
| C5 | 1.0 | 44,500 | 46,300 | 34 | 170 | 87 |
| C5 | 3.0 | 48,900 | 52,800 | 40 | 67 | 66 |
| C6 | 1.0 | 44,700 | 59,800 | 17 | 190 | <36 |
| C6 | 3.0 | 47,700 | 52,000 | 30 | 83 | 57 |
| C7 | 2.0 | 50,900 | 62,200 | 30 | 190 | 48 |
| 8 | 2.0 | 40,000 | 48,700 | 130 | 370 | 310 |
| 9 | 2.0 | 49,100 | 58,800 | 100 | 430 | 150 |

Examples 10-12

Blends

Polyethylene is made as in Example 2 and is blended with varying amounts of LLDPE (linear low density polyethylene, prepared with a single-site catalyst and 1-hexene comonomer; density: 0.912 g/cm³; melt index: 1.0). Films are prepared as described in Example 1 and the results are shown in Table 5.

Addition of LLDPE increases the impact strength while maintaining a modulus greater than 35,000 psi.

TABLE 5

Film Properties

| Polymer Ex. | Film Thickness (mils) | Weight % LLDPE | MD Modulus (psi) | MD Tear (g/mil) | TD Tear (g/mil) | Dart Drop (g/mil) |
|---|---|---|---|---|---|---|
| 10 | 2.5 | 0 | 56,700 | 120 | 500 | 130 |
| 11 | 2.5 | 20 | 49,600 | 190 | 520 | 150 |
| 12 | 2.5 | 40 | 41,800 | 220 | 490 | 220 |

The preceding examples are meant only as illustrations. The following claims define the invention.

We claim:

1. A thick film comprising polyethylene and less than 3% by weight LDPE, wherein the polyethylene comprises recurring units of ethylene and 1-octene and has a bimodal molecular weight distribution, a density within the range of 0.92 to 0.94 g/cm³, a melt index within the range of 0.20 to 1.0 dg/min, and a viscosity enhancement factor within the range of 2 to 7; wherein the film has a thickness from 50 to 250 microns; and wherein a 2-mil film blown from the polyethylene has a machine-direction modulus greater than 35,000 psi and a dart drop impact strength of greater than 125 g/mil; wherein the polyethylene is made by a process which comprises polymerizing the ethylene and the 1-octene in two slurry reaction zones in the presence of a catalyst system comprising an activator, a supported bridged complex, and a supported non-bridged complex wherein the bridged complex is a dialkylsilylene-bridged cyclopentadienyl(indeno[2,1-b]indolyl)zirconium complex, the non-bridged complex is a cyclopentadienyl(indeno[1,2-b]indolyl)zirconium complex, and the molar ratio of the bridged to non-bridged complex is within the range of 0.7:1 to 5:1.

2. The film of claim 1 wherein from 35 to 75 weight % of the polyethylene is produced in a first reaction to produce a first-zone material having a melt index within the range of 0.5 to 15 dg/min which is transferred as a slurry to a second reaction zone.

3. The film of claim 1 wherein the film is blown in-the-pocket.

4. The film of claim 1 comprising 0 wt % of LDPE.

5. The film of claim 1 further comprising from 1 to 40% by weight LLDPE.

* * * * *